United States Patent Office 3,143,499
Patented Aug. 4, 1964

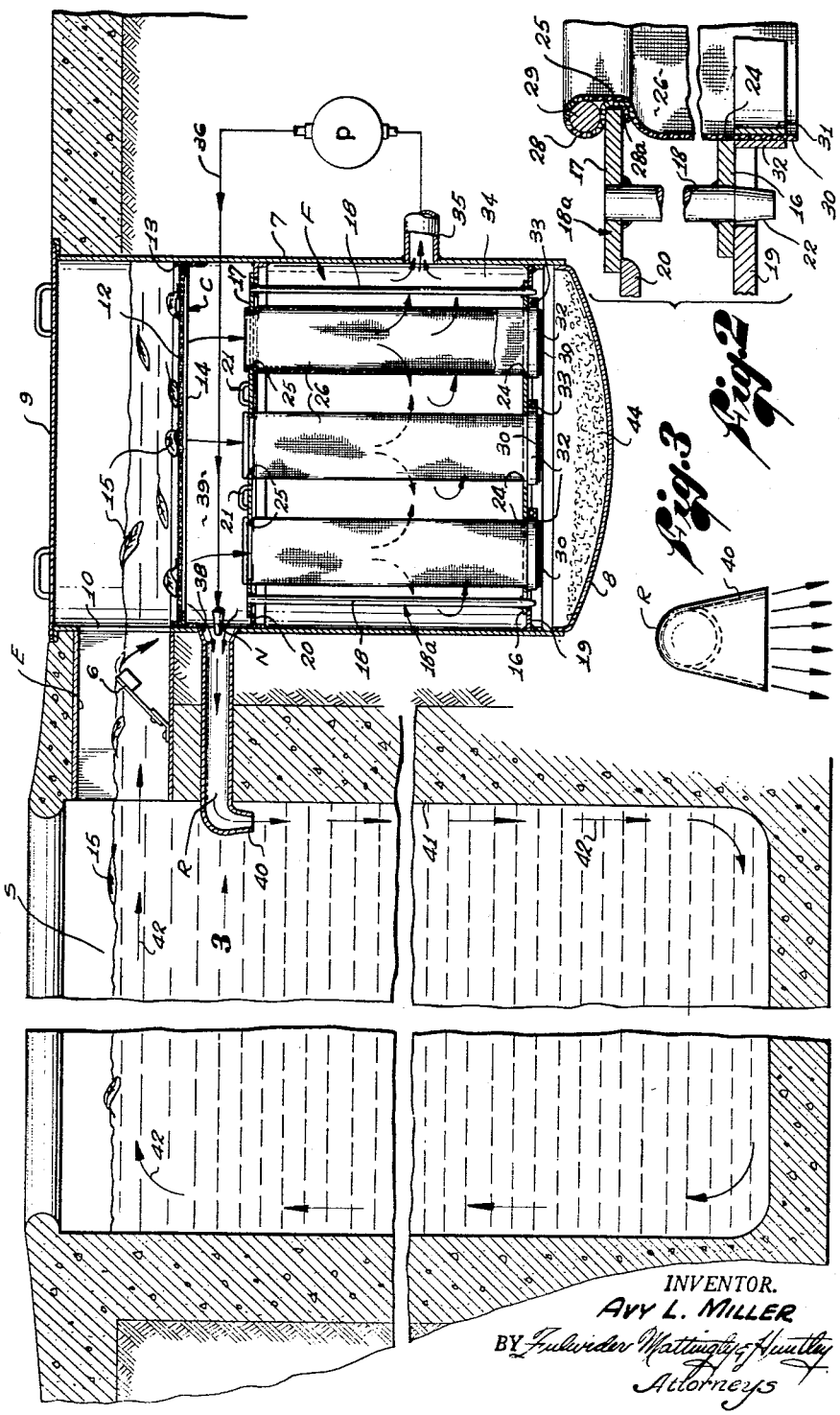

3,143,499
HIGH SKIM RATE SWIMMING POOL FILTER
Avy L. Miller, 13246 Saticoy St., North Hollywood, Calif.
Filed May 16, 1960, Ser. No. 29,388
3 Claims. (Cl. 210—169)

This invention relates to fluid filters and more specifically to filters which are particularly useful for skimming swimming pools while filtering the water in the pool.

Dirt and other foreign objects, such as leaves and insects, continually fall into swimming pools thus contaminating the water. Much of the dirt becomes suspended in the water and slowly settles to the bottom of the pool, while articles such as leaves and insects normally float for a while on the surface of the water before losing their buoyance and settling to the bottom of the pool. To remove such floating matter, swimming pools are provided with filtering systems which withdraw the water from the pool at the surface thereof so that the floating objects will be removed first in the filtering process. Then, after the water is passed through sand or some other filtering means, it is returned to the pool.

Such floating bodies are very conspicuous and even in small numbers are decidedly objectionable. Further, quite often, such objects fall into the swimming pool in greater amounts than the dust in the air. Consequently, greater quantities of water must be pumped through the filter system to remove the floating objects than would be required merely to maintain the amount of suspended dirt at a satisfactory level.

Because of the above described manner of contamination, prior swimming pool filter systems are inefficient or not completely effective. More specifically, in those systems all the water which is drawn into the system is passed through the entire filter including a stage which is fine enough to remove the suspended dirt. The pressure loss across such filters, even when they are clean, is normally fairly large and this pressure loss increases with the rate of flow through the filter and the length of time it has been in use. To avoid the increased costs involved in larger equipment needed to overcome such pressure losses, the swimming pool owner normally comprises and satisfies himself with incomplete skimming.

Filter systems embodying the present invention overcome these difficulties by providing a multistage filter, having an upstream skim filter which has a relatively low pressure-drop, for skimming water which passes through it, and a downstream filter which is fine enough to remove suspended dirt and the like. Means are provided for passing more water through the skin filter than the fine filter.

A further difficulty encountered with swimming pool filter systems heretofore available, is that they are hard to clean and otherwise maintain in proper operative condition. Filters embodying the present invention overcome this difficulty as either or both stages of the filter may be easily removed for cleaning. Further, due to the unique arrangement of the fine filter, silt which cakes up on it may be dislodged from the filter surface by temporarily reversing the flow through the filter whereupon the silt thus dislodged drops out of the main stream of water passing through the filter.

With the foregoing in mind, it is a major object of this invention to provide apparatus of the class described which will filter more efficiently to effect optimum removal of both fine suspended particles and coarser floating material.

A further object of this invention is to provide a multiple stage filter which is capable of passing more fluid through one filter stage than another filter stage.

It is a still further object of this invention to provide an improved swimming pool filter system which will skim more water than it filters.

A major object of this invention is to provide an improved low cost filter which is easily cleaned and maintained.

Still another object of this invention is to provide a swimming pool filter system which will remove the larger particles from the surface of the water at a rapid rate without excessive power requirements.

A further object of this invention is to provide, for filtering bodies of water, a filter system which produces currents to direct articles floating on the water surface toward the system inlet.

It is still another object of this invention to provide a unique two-stage filter which uses the stream of fluid drawn through both stages of the filter to draw an additional amount of fluid through the upstream stage.

The foregoing and additional objects and advantages of this invention will become apparent in the detailed description below considered in conjunction with the attached drawings wherein:

FIGURE 1 is a schematic view of a swimming pool filter system embodying the present invention.

FIGURE 2 is an enlarged fragmentary view of a portion of the filter in FIGURE 1.

FIGURE 3 is an enlarged view of a discharge nozzle as viewed from the position of arrow 3 in FIGURE 1.

In FIGURE 1, a two-stage filter system embodying the present invention is shown adjacent swimming pool S. As illustrated by the flow arrows, water from the pool enters the filter through an entrance passage E and then passes through a coarse or skim filter C before passing through a fine filter F. Flow through the filters C and F is effected by a pump P which draws water from the downstream side of filter F and then ejects it through nozzle N into the inlet of the return conduit R which carries the water back to the swimming pool S.

Since the velocity of the water ejected from nozzle N acts as an aspirator pump, a substantial amount of water flows directly from the downstream side of skim filter C back into the swimming pool S without passing through fine filter F. Therefore, filter systems embodying the present invention are able to remove large objects from a relatively high volume stream of water while suspended smaller particles in the swimming pool water are removed from a stream having a relatively smaller rate. As will appear from the discussion to follow, this permits the use of a smaller pump for the overall system.

Referring now to the filter in more detail, a floating weir 6 is hingedly fastened in the entrance passage E extending laterally across the passage. This causes more surface water to be drawn into the filter than the deeper water, thus aiding in the skimming operation. Since such "skimming weirs" are known in the art, no further detailed description is deemed necessary.

The main portion of the filter is enclosed in a generally cylindrical housing 7 closed at its lower end by bottom 8 and at its upper end by removable cover 9. Extending across the housing 7 just below opening 10 where water from the passage E enters, is the strainer or coarse filter C. In this embodiment, the filter C comprises a screen 12 secured to a circular frame 13 which in turn is removably supported on a peripheral ledge 14 affixed to the housing 7. The screen 12 is only fine enough to strain the larger objects such as leaves 15 and insects out of water passing through the screen. Therefore, there is relatively little pressure drop across the screen 12 even though the flow rates through it are high.

Located near the lower end of the housing 7 is the fine filter F. The fine filter F is mounted in an integral frame 18a which comprises a lower circular partition 16 and an upper circular partition 17 which are held in spaced parallel relation by a series of spacer rods 18 welded thereto. The frame 18a thus formed is supported in the housing 7 by a lower peripheral support-ledge 19 and an upper peripheral support-ledge 20, which are attached to the side of the housing 7. These support-ledges 19 and 20 are spaced apart a distance equal to the spacing of partitions 16 and 17. Thereby, a seal is formed between the respective support-ledges and partitions which is adequate for a purpose which is described below.

It should also be noted that the diameter of the opening defined by the upper support-ledge 20 is slightly larger than the outside diameter of the lower partition 16. This arrangement allows the fine filter F to be removed for cleaning by grasping handles 21 on the upper partition 17 and lifting the filter F from the housing 7. When the filter F is returned to its operative position after cleaning, the lower ends of the spacer rods 18 cooperate with the inner edge of the lower support-ledge 19 to orient the assembly. As illustrated best in FIGURE 2, each of the spacer rods 18 is tapered at its lower end 22 to facilitate the re-positioning operation.

In the embodiment shown, the frame 18a supports a number of open end fabric sleeves 26 which actually perform the filtering operation. To receive the sleeves 26, the partitions 16 and 17 each are provided with a plurality of sets of axially aligned holes 24 and 25, respectively, through each set of which extends one of the sleeves 26.

The sleeves 26 are made of material such as nylon or cotton which is woven tightly enough to remove the suspended dirt from the water. Although only single layer sleeves are shown, multiple layer sleeves may be used alternatively. Due to the relatively close weave of the sleeve fabric in either case, there would be a very large pressure drop across the walls of the sleeves, if the water were forced through them at high rates, e.g., if all the water passing through the system were required to pass through the fine filter F.

Referring now to FIGURE 2, it can be seen that upper end 28 of each sleeve 26 is wrapped around a metal hoop 29 and peripheral edge 28a is then passed back through the hole 25. This quickly accomplished and inexpensive manner of securing the upper ends 28 has the advantage that it is self-sealing. That is, the downward pull on each upper end 28 produced by the water bulging the sleeve 26 causes the hoop 29 to grip and seal the upper end 28 against the partition 17.

After the upper end of each sleeve 26 is secured in the above manner, its lower end 30 is passed through the associated hole 24 and secured. To this end, an inner ring 31 is located within the lower end 30 and then an outer clamp 32 is applied around the end 30 and tightened by means of a bolt 33 (see FIGURE 1). It is important to note that the outside diameter of the ring 31 is only slightly smaller than hole 24. Therefore, the thickness of clamp 32 will cause its upper edge to engage the lower face of partition 16 to prevent upward movement of the lower end 30. Thereby, the lower end 30 is effectively sealed against the partition 16 when the sleeve 26 is bulged by the pressure drop of flow therethrough. The above arrangement allows quick and easy replacement of the filter sleeves 26.

Since, as mentioned above, the partitions 16 and 17 are effectively sealed against the respective support edges 19 and 20, a chamber 34 is formed between the partitions and externally of the sleeves 26. Therefore, by connecting the intake side of the pump P to chamber 34 through intake conduit 35, the water may be caused to flow through the walls of the fabric sleeves 26 as illustrated by the arrows.

The discharge side of the pump P is connected through a pipe indicated schematically by the arrow 36 to a nozzle N, which discharges a high-velocity jet into the return conduit R, as described above.

In the embodiment shown, the return conduit R has an inlet 38 opening from chamber 39, which chamber is between the skim filter C and fine filter F. Preferably, though not necessarily, the inlet 38 is flared to improve the aspirator pump performance. It may be seen that the nozzle N may be located at other positions. For instance, the pipe 36 may enter through the side of the conduit R and then turn downstream at a right angle so that the nozzle N ejects the water toward the pool S.

It is desirable that currents be set up in the pool S so that surface water will be directed toward the entrance of passage E and also to hold as much fine material as possible in suspension. To this end, water discharging from return pipe R is directed through fan-shaped discharge nozzle 40 downwardly along the side 41 of the pool S. The discharge nozzle 40 is located directly below the entrance passage E and therefore a current indicated by the arrows 42 is set up in the water of the swimming pool S to achieve this desirable result.

The operation of the filter system is as follows. When it is desired to filter the water in the swimming pool S, the pump P is put in operation. This causes water to be drawn through the screen 12 and the sleeves 26 into the pump intake conduit 35. This water is then ejected via pipe 36 and nozzle N into the return pipe R as described above. The velocity of the water ejected from nozzle N aspirates a substantial part of the water from the compartment 39 and returns it directly to the pool S after having passed only through the screen 12. With this arrangement, it will be seen that large amounts of water may be passed through the screen 12 without the necessity of also forcing it all through the walls of the sleeves 26, which of necessity would require substantially increased pumping power.

During operation of the system, a film of sediment slowly builds up on the inner side of the walls of the sleeves 26. This film must be intermittently removed in order to enable the filter system to operate satisfactorily. Due to the construction of the fine filter F and more particularly the orientation of the sleeves 26, such cleaning may be easily accomplished. The direction of the pump P is reversed and, since nozzle 40 and nozzle N are below the level of the water, water is taken in through nozzle N and discharged into the chamber 34 causing the water to flow through the walls of the sleeves 26 in a reverse direction. This loosens the film of sediment and the sediment thus loosened falls by gravity to the bottom 8 of the housing 7 as indicated at 44. Because of the relatively large space available at the bottom 8, this operation may be repeated many times before it is necessary to give the filter a thorough cleaning.

To clean the screen 12, it is merely necessary to remove the cover 9 and lift the screen 12 from the casing 7. Then the leaves and other relatively large foreign matter are shaken from the screen and it is replaced.

In order to remove the sediment or dirt 44, to thoroughly clean the filter, the following steps are taken. The screen 12 is removed as just described. Then, by grasping the handles 21, the fine filter F is pulled from the casing 7. At this time, the inside of the casing 7 is completely exposed and the dirt 44 may be scooped out.

Although only one filter system embodying the present invention has been shown, it will be apparent to those skilled in the art that such is by way of illustration only and that numerous changes may be made thereto without departing from the spirit of the invention. Therefore, it is my intention that my invention be limited solely by the scope of the appended claims.

I claim:

1. A filter system for a swimming pool comprising a coarse filter; means feeding water from adjacent the top of the pool in relatively large quantities to said coarse filter; a fine filter; means passing a smaller quantity of said coarse filtered water through said fine filter; means returning the portion of the coarse filtered water which does not pass through the fine filter to the pool;

and means returning the fine filtered water to the pool.

2. A filter system for a swimming pool comprising a coarse filter; means feeding water from adjacent the top of the pool in relatively large quantities to said coarse filter; a fine filter; means passing a smaller quantity of said coarse filtered water through said fine filter; means returning the portion of the coarse filtered water which does not pass through the fine filter into the pool in a direction to create a circulation within the pool which moves the floating debris toward the coarse filter; and means returning the fine filtered water to the pool.

3. A filter system for a swimming pool comprising a coarse filter; means feeding water from adjacent the top of the pool in a relatively large quantity to said coarse filter; a fine filter; means passing a smaller quantity of said corase filtered water through said fine filter; means injecting said fine filtered water through said coarse filtered water to insert a portion of the latter directly back into the pool; and means directing the combined coarse and fine filtered water into the pool in a direction to move the top of the pool water toward the coarse filter to carry floating debris thereto.

References Cited in the file of this patent

UNITED STATES PATENTS

| | | |
|---|---|---|
| 2,004,825 | Morgans | June 11, 1935 |
| 2,247,116 | Day | June 24, 1941 |
| 2,502,052 | Landon | Mar. 28, 1950 |
| 2,754,005 | Tursky | July 10, 1956 |
| 2,914,180 | Konopka et al. | Nov. 24, 1959 |
| 2,968,404 | Hotz | Jan. 17, 1961 |